Patented Aug. 8, 1939

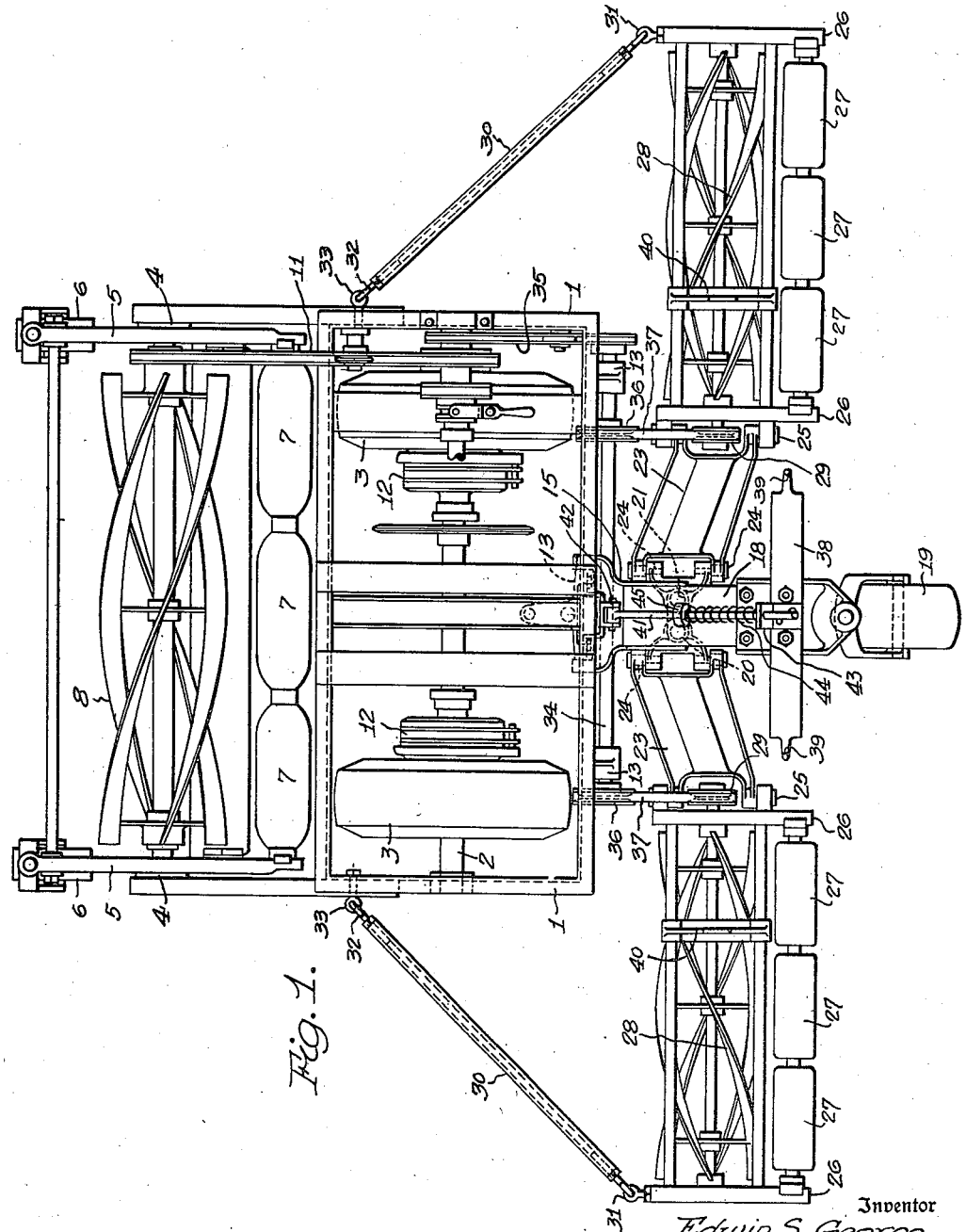

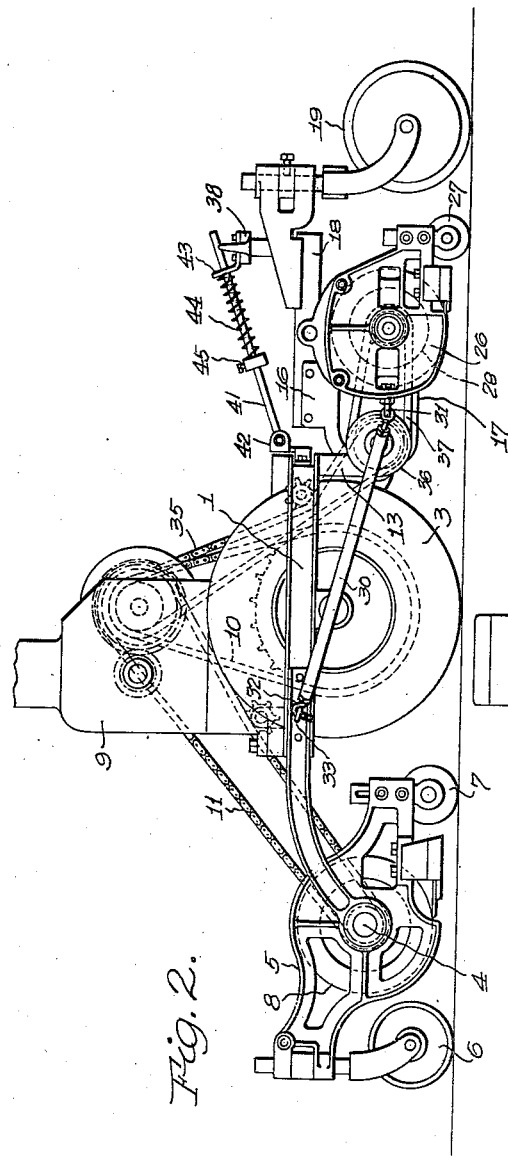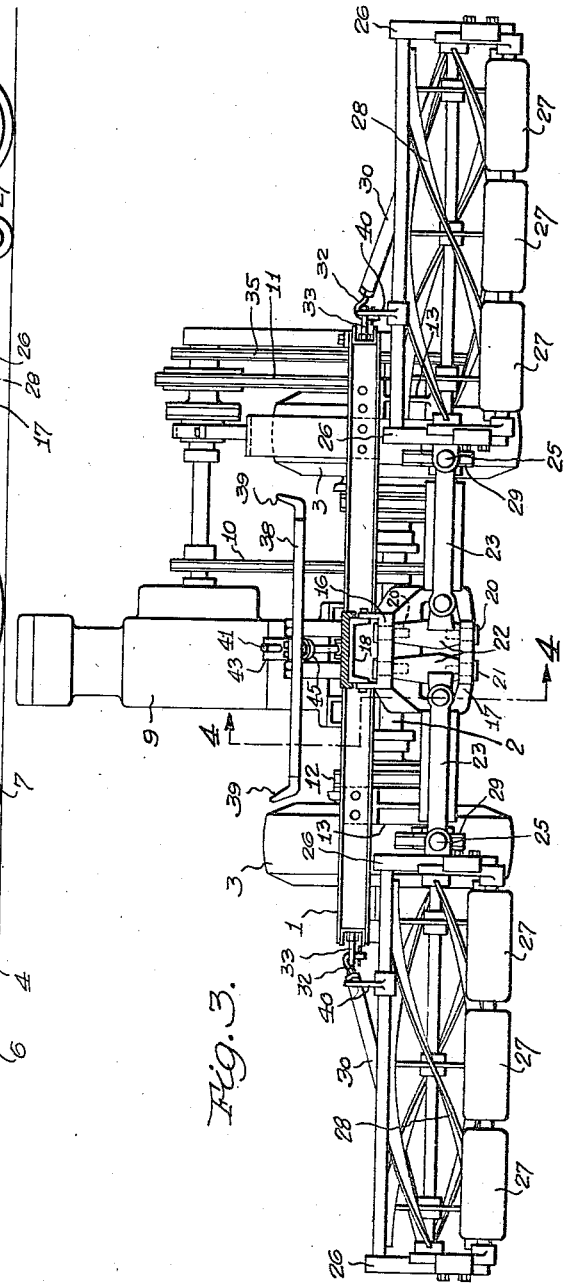

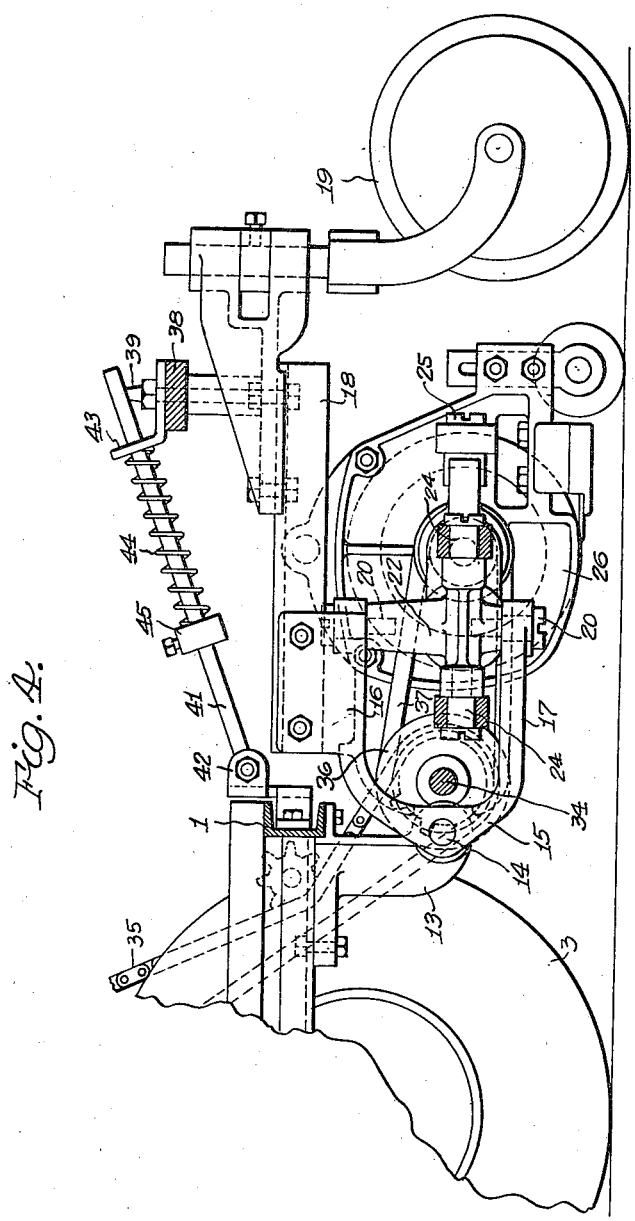

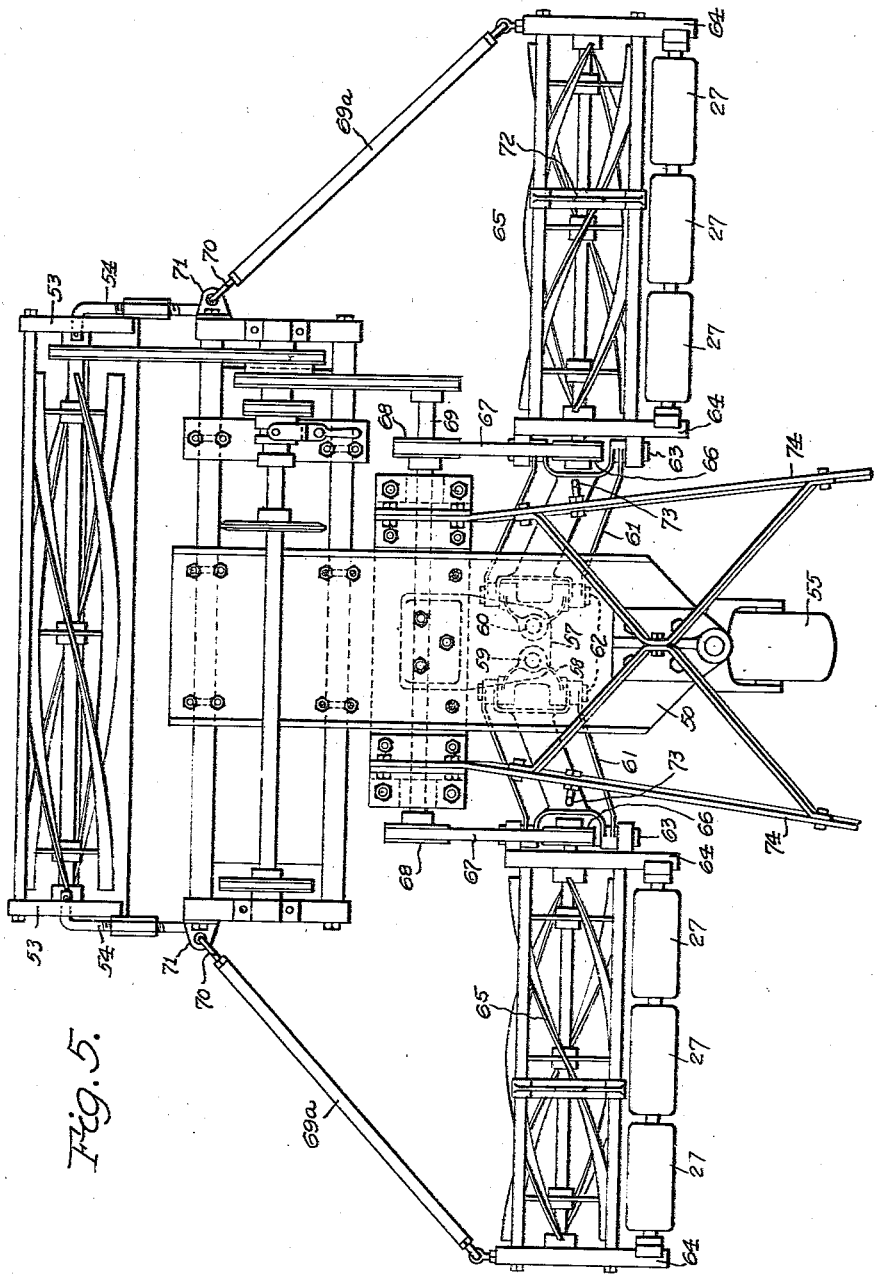

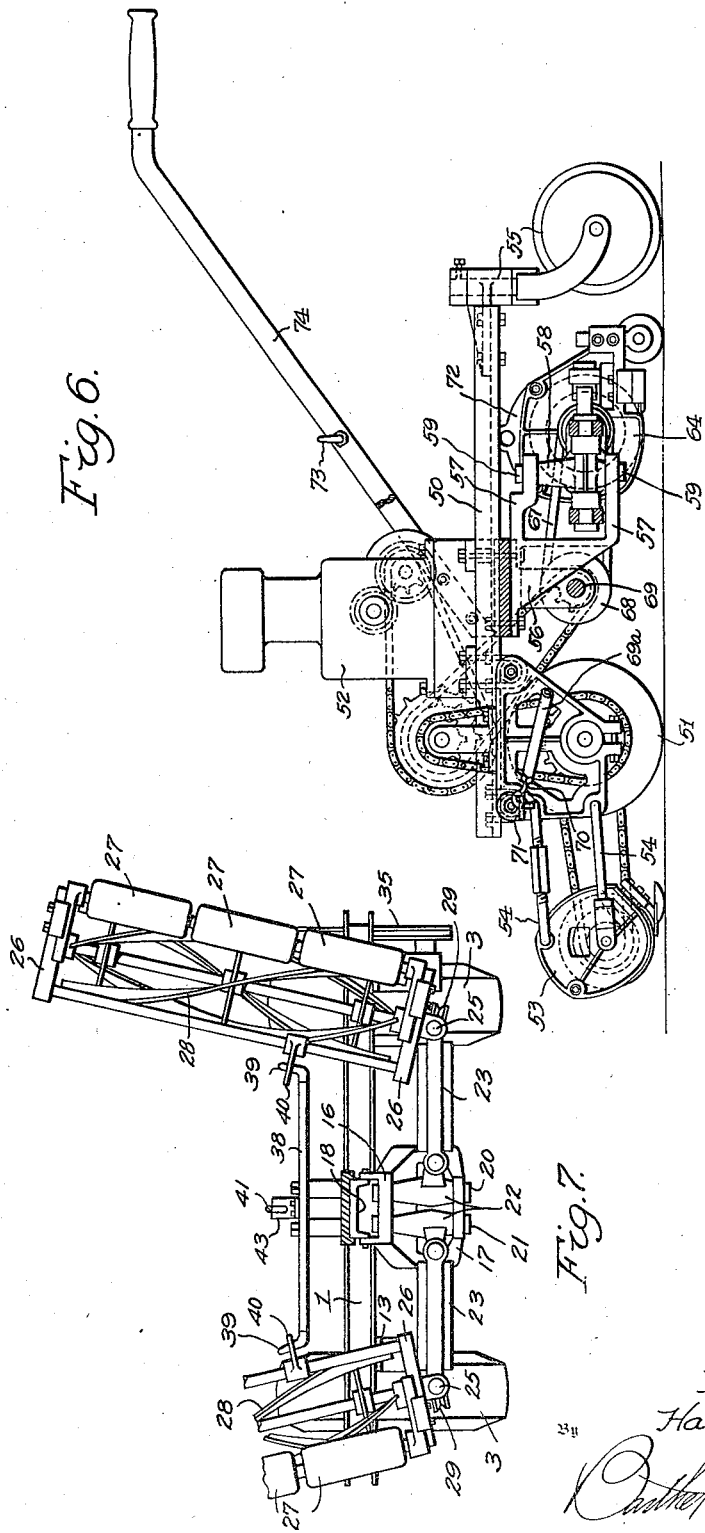

2,168,706

UNITED STATES PATENT OFFICE 2,168,706

LAWN MOWER

Edwin S. George, Bloomfield Hills, and Harold L. Blydenburgh, Highland Park, Mich., assignors to The Moto-Mower Company, Detroit, Mich., a corporation of Michigan Application June 13, 1938, Serial No. 213,380

17 Claims. (Cl. 56—7)

This invention relates to improvements in lawn mowers, and pertains more particularly to mowers of the motor driven type.

Lawn mowers of the type operated by motor driven wheels or rollers are generally formed of comparatively narrow width, in order that they may be readily manipulated, and also in order that unevenness of the ground surface laterally with respect to the mower will not materially affect the grass cutting function. In such motor-mower units the cutting reel usually has a support which permits sufficient flexibility between the frame and the cutting reel in order that the cutting function will not be affected by the travel of the ground engaging wheels or rollers, or in other words, unevenness in the the ground surface in the direction of the length of the mower. To increase the cutting capacity of such power mowers, auxiliary cutting units are attached to the main mower by flexible connections, so that they travel therewith but flex relative thereto when encountering undulating surfaces.

An important object of this invention is to provide a motor-mower unit with auxiliary cutting units connected thereto in such manner that they do not affect the balance of the main mower so as to adapt the cutting elements of main mower frame is shown for purposes of illustration only as being supported at its rear by motor-driven ground engaging rolls or wheels, it being understood that any other form of ground engaging means can be used, and at its forward end it is supported in any appropriate manner by the main cutting unit with or without the use of flexible or pivotal connections between said main frame and said main cutting unit.

An equally important object of this invention is to improve the power-driven type of lawn mowers so as to to adapt the cutting elements of said mower for a substantially complete range of readily and self-obtainable cutting heights any of which heights being easily, accurately and quickly assumed by said parts themselves in accordance with the contour of the area over which said mower is being operated.

Another object of the invention is to provide flexible means for attaching auxiliary cutting units to a main mower frame, and means in conjunction therewith for driving the reels of said units, said flexible means permitting said units to move in vertical planes but preventing movement thereof either in horizontal planes or about their own axis. In this respect, the support for each of said units to said frame includes a member mounted on said frame by means of a horizontal pivot, or plurality thereof, extending longitudinally of said frame, and to the other end of which member the unit is longitudinally pivoted, said latter pivot, or plurality thereof, extending longitudinally of said frame. Power for driving the reels of said units is provided by belts or chains connected to pulleys on the units and main drive shaft.

Still another object is to improve a power-driven mower wherein the pivoted support for the auxiliary cutting units is mounted independently of the power shaft, but so closely related thereto that any change in distance between the power shaft pulleys and auxiliary unit pulleys due to the changing contour of the ground is so small as not to affect the drive conditions between the belts and pulleys.

Another object of the invention is to provide an auxiliary mower attachment of the above-mentioned character wherein the auxiliary cutters may be moved from their laterally projecting cutting position to an elevated position in close proximity to the main mower frame. In this respect the mower may be easily handled in moving from one work location to another.

With the above and other ends in view, the invention is more fully disclosed with reference to the accompanying drawings, in which—

Figure 1 is a plan view;
Fig. 2 is a side elevation;
Fig. 3 is a front elevation;
Fig. 4 is a vertical section taken on the line 4—4 of Fig. 3;
Fig. 5 is a top plan view of a modified unit;
Fig. 6 is a side elevation thereof; and
Fig. 7 is a front elevation similar to Fig. 3 but showing one of the auxiliary units in elevated position.

Like characters of reference are employed throughout to designate corresponding parts.

The main mower comprises a frame structure 1 supporting a transverse axle formation 2 upon which the ground engaging wheels or rolls 3 are mounted. The forward end of the frame 1 is pivotally connected at 4 to a main cutter unit 5, embodying casters 6, a plurality of ground engaging rollers 7, and a cutting reel 8. Upon the frame 1 is an engine 9 having its power shaft connected by a chain 10 to the axle formation 2, and by a chain 11 to the cutting reel 8. The axle formation 2 includes clutches 12 which may be operated to drive the wheels or rolls 3 selectively or in unison, but inasmuch as they form no part of this invention they are not described in detail here.

Attached to the frame 1 is a rigid depending bracket 13 supporting a transverse pivot 14 about which a rearwardly extending yoke 15 is fulcrumed. The yoke 15 is forked to provide a pair of vertically spaced arms 16 and 17, the upper of which has an extension structure 18 attached thereto. A readily vertically adjustable ground engaging member 19 is supported at the rearmost end of the extension 18 and supports the rear or free end of the yoke.

Between the two arms 16 and 17 are two laterally spaced pivots 20 and 21 each supporting a cross 22. Laterally extending links 23 are connected to the crosses 22 by longitudinally extending pivots 24. The outer ends of the links 23 are connected by longitudinally extending pivots 25 to the frame structures 26 of the auxiliary mower units. The auxiliary mower units each have ground engaging rolling members 27 and cutting reels 28 equipped with drive pulleys 29. It will be noticed that each link 23 is sufficiently wide at each of its bearing ends so as to provide against even abnormal torsional stresses thereat, thereby preventing the slightest attempt at movement of the auxiliary unit about its axis. It will also be noticed that each auxiliary unit is provided, by the horizontal and longitudinally extending pivots 24 and 25, with means whereby the unit is free to move vertically about either of its ends or vertically as a whole with its axis remaining horizontal or tilted to any reasonable extent in any direction within the vertical plane of movement.

As is at present apparent, the yoke 15 is movable about the horizontal pivot 14, and the links 23 are movable about the vertical pivots 20 and 21, the former movement permitting the auxiliary units to move vertically, and the latter movement permitting them to move horizontally. However, horizontal movement of the auxiliary units about the pivots 20 and 21 during mowing is undesirable, so drag links 30 are provided and are pivotally connected at 31 to the cutter frames 26, links 30 being hooked at their forward ends at 32 which engage in the eyes 33 on the main mower frame 1. Drag links 30 are preferably adjustable so as to retain substantial parallel relationship between the longitudinal axes of the main cutter and the auxiliary cutters, and the feature of pivoting the links 23 at 20 and 21, rather than rigidly securing same to the yoke 15, being provided so that links 30 are truly and effectively adjustable for belt tightening after belt wear. Links 30 are necessarily rigid or the equivalent thereof so that forward and rearward movement of the auxiliary units is prevented.

Mounted in suitable bearings on the frame 1 is a transversely extending shaft 34, disposed as to extend between the arms 16 and 17 of the yoke 15, in a position as near the center of the pivot 14 as possible. The shaft 34 is connected to the operating shaft of the motor 9 by a chain 35, and has pulleys 36 spaced a distance equal to the spacing of the pulleys 29, and connected to the latter by friction belts 37.

It will be readily recognized that the ideal location for the transverse pivot 14 would be that at which same would be coincident with the axis of the power shaft 34, but the flexing action resulting from travel of the auxiliary cutting units over irregular surfaces set up pressure conditions which make this impractical. If the transverse pivot 14 were coincident with the axis of the power shaft 34, it would necessitate mounting the pivoted member 15 upon said shaft, and the shaft would become the draft member between the main mower and the auxiliary mowers. Such an arrangement results in such severe wear conditions that it is impractical.

The main mower unit will be equipped with guiding handles and controls similar to those ordinarily used on the present type of power mowers. They are not shown here because they form no part of the invention. An example of such controls may be found in Patent No. 2,013,597 issued to H. L. Blydenburgh, September 3, 1935.

When the present mower combination is to be transferred from one location to another, the auxiliary cutting units are moved to an elevated position wherein they reside in a non-projecting position relative to the main frame. For this purpose a rigid transverse member 38 is secured to the bracket or extension 18 of frame 1, said member 38 having hook-up arms 39 on opposite ends thereof. Each auxiliary mower has an eye 40 attached thereto, and after disconnecting the drag links 30, the auxiliary units are lifted bodily and their eyes 40 are placed in engagement with the hook arms 39. When so positioned, the auxiliary units are out of contact with the ground and project laterally only a small distance, as compared to their normal position. The mower may thus be moved through much smaller spaces.

Upon reference to Fig. 1, it will be noted that the drag links 30 are adjustable as to length as has been said. When the belts 37 are new, unworn and first assembled, the drag links 30 are so adjusted that the auxiliary cutting units are directed slightly forwardly at their outer ends so that the axes of the main and auxiliary cutting reels are disposed slightly out of parallel. This condition doesn't last long because the greatest wearing is when the belts are new. When the belts wear or stretch, because of continued use, the drag links are lengthened to reduce this angularity or to even incline the auxiliary units a slight amount rearwardly, to thereby take up any slack in the belts.

With the auxiliary cutting units arranged and connected to the main mower, with their draft members pivoted, there is a tendency for the whole arrangement to buckle, due to pivoting of the yoke 15 and elevation of the ground engaging member 19 out of engagement with the ground. By maintaining contact of the member 19 with the ground this tendency may be avoided, but merely adding weight to said member is undesirable for the reason that the weight will cause the member 19 to form a crease in the lawn. To overcome this tendency a rod 41 is pivotally connected to a bracket 42 on the frame 1, and the free end of the rod extends loosely through a bracket 43 on the transverse member 38. A spring 44 is sleeved on the rod 41 and is compressed between an adjustable member 45 and the bracket 43.

In the embodiment shown in Figs. 5 and 6 the frame 50 is supported by ground engaging wheels or rollers 51 and carries an engine 52 which is operatively connected to the wheels or rollers for the purpose of propelling the mower. A main cutting unit 53 is attached to the frame 50 by linkage 54 having the characteristics of a parallelogram. The rear end of the frame 50 is supported by a readily vertically adjustable ground engaging member 55.

Depending from the frame 50, to the rear of the wheels or rollers 51 and in advance of the member 55, is a rigid bracket 56 having a pair of spaced arms 57 between which universal joint crosses 58 are mounted by vertical pivots 59 and 60. Laterally extending links 61 are connected at their inner ends to respective crosses 58 by longitudinally extending pivots 62, and at their outer ends they are connected by longitudinal pivots 63 to the frames 64 of auxiliary cutter units. Each auxiliary cutter unit has a reel 65 with an operating pulley 66, and the two pulleys 66 are connected by belts 67 to respective pulleys 68 on the shaft 69 which is driven by the engine 52.

Adjustable drag links 69a have hooks 70 thereon engaging brackets 71 on the frame 50, and when the auxiliary cutters are not in use, the hooks 70 are released and the cutters are elevated. The cutters are held elevated by placing them in a position where the brackets 72 thereon engage the hooks 73 on the guiding handles 74.

Although specific embodiments of the invention have been illustrated and described it will be understood that various changes may be made within the scope of the appended claims without departing from the spirit of the invention, and such changes are contemplated.

What we claim is:

1. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, and auxiliary cutting units connected to said links by longitudinally extending pivots.

2. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, and detachable drag links connected to the outer ends of the auxiliary units and to said frame.

3. In a lawn mower, a power mower unit having a frame, and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, and detachable drag links connected to the outer ends of the auxiliary units and to said frame, said drag links being adjustable as to length.

4. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, each auxiliary unit having a cutter and an operating pulley, and a power shaft supported by said frame in close proximity to said horizontal transversely extending pivot, said power shaft having pulleys thereon connected to said cutter unit pulleys by belts.

5. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, each auxiliary unit having a cutter and an operating pulley, and a power shaft supported by said frame in close proximity to said horizontal transversely extending pivot, said power shaft having pulleys thereon connected to said cutter pulleys by belts, and detachable drag links connected to the outer ends of the auxiliary units and to said frame.

6. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, each auxiliary unit having a cutter and an operating pulley, and a power shaft supported by said frame in close proximity to said horizontal transversely extending pivot, said power shaft having pulleys thereon connected to said cutter pulleys by belts, and detachable drag links connected to the outer ends of the auxiliary units and to said frame, said drag links being adjustable as to length.

7. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, and a cooperating means on said frame and auxiliary units for supporting said auxiliary units in an elevated position.

8. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, detachable drag links connected to the outer ends of the auxiliary units and to said frame, and cooperating means on said frame and auxiliary units for supporting said auxiliary units in an elevated position.

9. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, detachable drag links connected to the outer ends of the auxiliary units and to said frame, said drag links being adjustable as to length, and cooperating means on said frame and auxiliary units for supporting said auxiliary units in an elevated position.

10. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, each auxiliary unit having a cutter and an operating pulley, a power shaft supported by said frame in close proximity to said horizontal transversely extending pivot, said power shaft having pulleys thereon connected to said cutter pulleys by belts, and cooperating means on said frame and auxiliary units for supporting said auxiliary units in an elevated position.

11. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, each auxiliary unit having a cutter and an operating pulley, and a power shaft supported by said frame in close proximity to said horizontal transversely extending pivot, said power shaft having pulleys thereon connected to said cutter pulleys by belts, detachable drag links connected to the outer ends of the auxiliary units and to said frame, and cooperating means on said frame and auxiliary units in an elevated position.

12. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, and cooperating means on said frame and auxiliary units for supporting said auxiliary units in an elevated position.

13. In a lawn mower, a power mower unit having a frame and a main cutting unit, said frame being supported at its forward end by said main cutting unit and at its rear end by driving rollers, a draft member attached to said frame by a horizontal pivot extending transversely of the frame, a caster supporting the free end of said draft member, laterally extending links, a pair of universal joint crosses having vertical pivots connected to said draft member and horizontal pivots attached to said links, auxiliary cutting units connected to said links by longitudinally extending pivots, each auxiliary unit having a cutter and an operating pulley, and a power shaft supported by said frame in close proximity to said horizontal transversely extending pivot, said power shaft having pulleys thereon connected to said cutter pulleys by belts, and detachable drag links connected to the outer ends of the auxiliary units and to said frame, said drag links being adjustable as to length, said caster being vertically adjustable for moving said draft member about said first horizontal pivot for selectively changing the distance between the ground and said auxiliary cutting units.

14. In a lawn mower having a main mower unit and a supporting frame therefor, a plurality of auxiliary mower units operable for being employed with and extending laterally from the main mower unit, a supporting member for said auxiliary units and pivotally supported by the frame for movement about a transverse, horizontal axis, a coupling for each of said auxiliary units and supported by said supporting member for individual movement about a vertical axis, and a link for each of said auxiliary units and being supported at one end by one of said couplings for movement about a longitudinal, horizontal axis and having supported at its other end the auxiliary unit for movement about a longitudinal, horizontal axis.

15. In a lawn mower having a main mower unit and a supporting frame therefor, a plurality of auxiliary mower units operable for being employed with and extending laterally from the main mower unit, a supporting member for said auxiliary units and pivotally supported by the frame for movement about a transverse, horizontal axis, a coupling for each of said auxiliary units and supported by said supporting member for individual movement about a vertical axis, and a link for each of said auxiliary units and being supported at one end by one of said couplings for movement about a longitudinal, horizontal axis and having supported at its other end the auxiliary unit for movement about a longitudinal, horizontal axis, each of said links being supported by its respective coupling through the agency of a pair of axially aligned pivots and each of said auxiliary units being supported by its respective link through the agency of another pair of axially aligned pivots whereby movement of said auxiliary units about their own axes is prevented.

16. In a lawn mower having a main mower unit and a supporting frame therefor, a plurality of auxiliary mower units operable for being employed with and extending laterally from the main mower unit, a supporting member for said auxiliary units and pivotally supported by the frame for movement about a transverse, horizontal axis, a coupling for each of said auxiliary units and supported by said supporting member for individual movement about a vertical axis, a link for each of said auxiliary units and being supported at one end by one of said couplings for movement about a longitudinal, horizontal axis and having supported at its other end the auxiliary unit for movement about a longitudinal, horizontal axis, and means for controlling the movements of said couplings about said vertical axes without affecting the movement of said supporting member about said transverse, horizontal axis and the movements of said links and said auxiliary units about said longitudinal, horizontal axes.

17. In a lawn mower having a main mower unit and a supporting frame therefor, a plurality of auxiliary mower units operable for being employed with and extending laterally from the main mower unit, a supporting member for said auxiliary units and pivotally supported by the frame for movement about a transverse, horizontal axis, a coupling for each of said auxiliary units and supported by said supporting member for individual movement about a vertical axis, a link for each of said auxiliary units and being supported at one end by one of said couplings for movement about a longitudinal, horizontal axis and having supported at its other end the auxiliary unit for movement about a longitudinal, horizontal axis, and means for holding said auxiliary units in fixed position with respect to movement about their longitudinal, horizontal connections with said links.

EDWIN S. GEORGE.
HAROLD L. BLYDENBURGH.